United States Patent
Pal et al.

(10) Patent No.: US 7,634,498 B2
(45) Date of Patent: Dec. 15, 2009

(54) INDEXING XML DATATYPE CONTENT SYSTEM AND METHOD

(75) Inventors: Shankar Pal, Redmond, WA (US);
Istvan Cseri, Redmond, WA (US);
Gideon Schaller, Bellevue, WA (US);
Oliver N. Seeliger, Sammamish, WA (US); Denis Y. Altudov, Redmond, WA (US); Denis V. Churin, Sammamish, WA (US); Sameer A. Verkhedkar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1 day.

(21) Appl. No.: 10/693,750

(22) Filed: Oct. 24, 2003

(65) Prior Publication Data

US 2005/0091188 A1    Apr. 28, 2005

(51) Int. Cl.
*G06F 7/00* (2006.01)
*G06F 17/00* (2006.01)
(52) U.S. Cl. .................. 707/103 R; 707/100; 707/101; 709/236
(58) Field of Classification Search .................. 707/3, 707/10, 102, 100, 103 R; 715/513, 205, 715/234; 726/27
See application file for complete search history.

(56) References Cited

U.S. PATENT DOCUMENTS

| | | | |
|---|---|---|---|
| 6,366,934 B1 * | 4/2002 | Cheng et al. | 715/513 |
| 6,377,953 B1 * | 4/2002 | Gawlick et al. | 707/102 |
| 6,584,459 B1 * | 6/2003 | Chang et al. | 707/3 |
| 6,915,303 B2 * | 7/2005 | Kauffman | 707/102 |
| 6,976,165 B1 * | 12/2005 | Carpentier et al. | 713/165 |
| 7,096,224 B2 * | 8/2006 | Murthy et al. | 707/100 |
| 2005/0055334 A1 * | 3/2005 | Krishnamurthy | 707/2 |

* cited by examiner

*Primary Examiner*—Etienne P LeRoux
*Assistant Examiner*—Susan Y Chen
(74) *Attorney, Agent, or Firm*—Woodcock Washburn LLP

(57) ABSTRACT

Storing and querying XML data in a primary table or document utilizes an index of XML data and includes creating a primary table structure, creating a primary XML index commensurate with the primary table structure, populating the primary table and the primary XML index, and running a query on the XML data in a primary table by utilizing the XML index. The XML index can be implemented as a node table. The node table may have a $B^+$-tree structure and be populated by shredding the XML values in the primary table. The XML data may be stored as binary large objects in an XML column of the primary table. Secondary XML indexes may be created to assist in the search and retrieval of XML data stored in the primary table. Both the primary XML index and the secondary XML index tables may be created using data definition language statements.

14 Claims, 2 Drawing Sheets

R

| PK | XML X | XML Y |
|---|---|---|
| 201 | <a>...</a> | <b>...</b> |
| 301 | <a>...</a> | NULL |

NTX

| PK | XID | PID | NID | TID | VALUE | LVALUE | HID |
|---|---|---|---|---|---|---|---|
| | OrdPath | OrdPath | Integer | Integer | Variant | Varbinary<maX> | Varchar |
| 201 | 1 | NULL | | ... | ... | ... | |
| 201 | 1.1 | 1 | | ... | ... | ... | |
| 201 | 1.3 | 1 | | ... | ... | ... | |
| 301 | 1 | NULL | | ... | ... | ... | |
| 301 | 3 | NULL | | ... | ... | ... | |

NTY

| PK | XID | PID | NID | TID | VALUE | LVALUE | HID |
|---|---|---|---|---|---|---|---|
| | OrdPath | OrdPath | Integer | Integer | Variant | Varbinary<maX> | Varchar |
| 201 | 201 | NULL | | ... | ... | ... | |
| 201 | 1.1 | 1 | | ... | ... | ... | |
| 201 | 1.3 | 1 | | ... | ... | ... | |
| 201 | 1.3.5 | 1.3 | | ... | ... | ... | |

Fig. 2

INDEXING XML DATATYPE CONTENT SYSTEM AND METHOD

FIELD OF THE INVENTION

The invention relates generally to the field of software querying over data sources, and more particularly to using an intermediate language to query over one or more XML or virtual XML data sources.

BACKGROUND OF THE INVENTION

The eXtensible Markup Language (XML) is a World Wide Web Consortium (W3C) endorsed standard for document and data representation that provides a generic syntax to mark up data with human-readable tags. XML does not have a fixed set of tags and thus allows users to define such tags as long as they conform to the XML standard. Data may be stored in XML documents as strings of text that are surrounded by text markup. The W3C has codified XML's abstract data model in a specification called the XML information set (XML Infoset). XML Schemas also may be used to apply a structure to the XML format and content. In the case of an XML Schema, a diagram, plan, or framework for XML data in a document may be defined. Although XML is a well-known format that may easily describe the contents of a document, other non-XML formatted data may be desirable in the same database. This produces a potential querying problem because of the inherent incompatibility. An example of such an incompatibility is the presence XML content in a relational database.

Search engines on relational databases are well-known. A typical standard is the Structured Query Language (SQL) relational database language. Both XML coded and SQL data may be placed in a single database to indicate some data relationship. However, the search of that database may become difficult because the XML values stored in the rows of the SQL database may appear as large objects expressed in text or binary form. Although the SQL relational database information may be fast and efficient, searching the large objects in the XML coded information of the relational database may be inefficient. Typically, the inefficiency results from the excessive time and computer resource consumption involved in opening and examining of the XML coded large objects every time a query is made on the XML data in the SQL database.

Thus, there is a need for a method and system which can efficiently perform a search on XML encoded data in either a stand-alone XML document or in combination with relational data such as that stored in a SQL table. The present invention addresses the aforementioned needs and solves them with additional advantages as expressed herein.

SUMMARY OF THE INVENTION

A method of storing and querying XML data that utilizes index structures on the XML data is described. An exemplary method of storing and querying includes creating a primary table structure with one or more XML data columns, creating a primary XML index commensurate with the primary table structure, populating the primary table and the primary XML index, and running a query on the primary table which utilizes the XML index to retrieve the XML data. The XML index is implemented as a node table wherein the population of the node table may be performed by shredding the input XML values stored as binary large objects in an XML column of the primary table. In one embodiment, the node table takes the form of a $B^+$-tree structure.

The creation of one or more secondary XML indexes corresponding to the primary table structure is described, wherein queries may run on the primary table by utilizing the secondary XML index to retrieve the XML data in the primary table. In one embodiment, data definition language statements are used within an application program to create an XML index on an XML data column contained within a data table or similar structure.

A system for the generation of a storage and querying embodiment of the invention is also disclosed wherein a computer system is utilized to implement the exemplary methods of the invention in generating and utilizing an XML index to perform an XML query on an XML data column.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is an exemplary representation of a primary table and corresponding node tables embodying exemplary aspects of the present invention;

DETAILED DESCRIPTION OF ILLUSTRATIVE EMBODIMENTS

Overview

Figure 1:
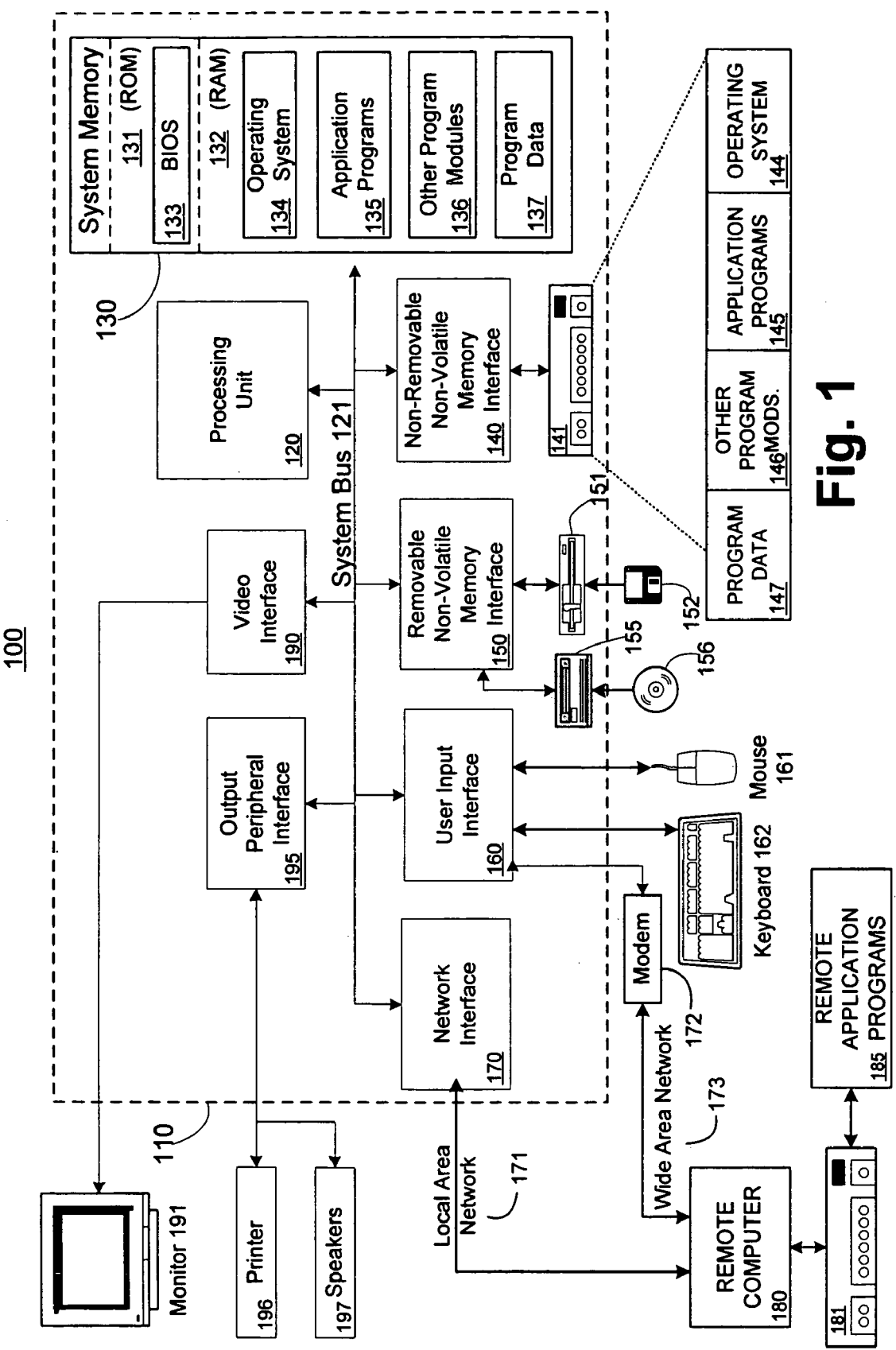
FIG. 1 is a block diagram showing an exemplary computing environment in which aspects of the invention may be implemented.

Queries on XML data may be time consuming because XML data may be voluminous and parsing the XML data during each query execution may waste processing time by repeated effort. XML data may be present in one or more stand alone XML files. Alternately, XML data may be stored in a database, such as a relational database. A relational database table can have one or more XML columns that may be untyped or typed according to a one or more XML schemas. The XML values populating these columns may be stored as binary large objects (BLOBS) for easier retrieval. But even in this convenient format, queries on the binary large objects may be slow.

In accordance with aspects of the invention, the results of parsing the binary large objects may be saved and future queries may use the results and run significantly faster. To set up queries that can be run on the parsed form of binary large objects, XML data is shredded into its basic components, termed XML nodes, and those components may be stored in a separate primary XML index also called a node table. Users may continue to submit their queries on the XML column, and the query utilizes the primary XML index by directing the query to the appropriate location identified in the node table The XML index allows indexing of all of the XML information set in one database structure without loss of information. The invention allows a relational query engine to efficiently evaluate XML query expressions due to the clustering of information in different ways using index table keys.

In a relational database embodiment, the user is permitted to access the XML column and create an XML index based on the content of the XML column. Structures can be created for the node table and the node table can be populated from the XML data stored in the XML column. Further aspects of the invention manage the correlation between the XML column and the underlying node table transparently such that the users merely submit queries to the XML data column instead of the XML index.

One embodiment implements the node table upon creation of the XML index via a data definition language (DDL) statement interface. From the user's perspective, only the XML columns are visible, and the user creates the XML index on the XML column. The DDL statements may create multiple B$^+$-tree structures, and populate them from the XML values stored in the XML column.

A single XML value can give rise to multiple node table rows. Furthermore, document order and structure inherent in XML instances are preserved by the XML index. In addition, the XML index preserves the "infoset" content of the XML values for untyped XML, and preserves the post-validation "infoset" content of the XML values for typed XML.

Exemplary Computing Device

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW) digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as ROM 131 and RAM 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET software platform, available from Microsoft Corporation in Redmond, Wash., includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of MICROSOFT® .NET's software platform languages and services, and in other distributed computing frameworks as well.

Exemplary Embodiments

FIG. 2 depicts a chart of a primary table R 200 having two XML columns 210 and 220. The chart 200 represents storage for the XML data stored as column XML X 210 and XML Y 220. The primary table R has a primary key PK, 221, that may include one or more columns and may be used to search for items in the table as is well known in the art. In accordance with the present invention, the construction of node tables for the data content in columns XML X and XML Y is permitted and enables more efficient searches of the XML column data. Table NTX 240 is a node table for the data in the XML X data table column 210. Similarly, NTY 280 is a node table for the data in the XML Y data table column 220. These node tables are one embodiment utilizing the principles of the invention to allow efficient searches of XML data through the use of a clustered organization of key columns in the node tables. The clustered keying of the XML information in the node tables allows indexing of all of the queryable XML information.

In the node table NTX 240, XID 241 is an identifier (OrdPath) for the XML node represented by the horizontal row. For example, a row 242 may represent a topmost node of the XML data for PK=201 in XMLx210. Note that the PK values in NTX 240 are the same as those represented in column 221. In general, rows in the node table capture the hierarchical relationships and the document order information among the nodes in the XML data. In this way, document order and document structure are preserved. The XID of the node's parent is stored in the computed PID column 243. PID is a prefix of the node's XID and is an OrdPath itself NID 244 is a token value for the XML node name, while TID 245 is a token value for the XML Schema type of the XML node. The VALUE column 246 stores the value, if one exists, of the node up to a pre-determined length, for example, 128 bytes. Longer values can be stored in the LVALUE column 247 with the first 128 bytes stored in the VALUE 246 column as well, for example. LVALUE is null if a node's value fits into the VALUE column 246. HID is a character encoded representation of the array of NID tokens representing the components of the path to the XML node. Thus, tokenized values may be converted to characters and used in a manner that may employ regular expression matching against the components of the path for query purposes.

The correlation between the primary table 200 rows and the corresponding XML nodes in the node tables 240, 280 may be maintained by duplicating the clustered, primary key, PK 221, from the primary table 200 into the node tables 240, 280. If the primary table 200 does not have a clustered, primary key, then some other unique, clustered key may be used or one may be introduced.

A clustered, primary key of the node table 240 may comprise the primary key 221 from the primary table 200 and the XID column 241; hence, the primary key 221 of the primary table 200 may generally have a finite limit. In one embodiment, the primary key 221 of the primary table 200 may not contain more than 15 columns. In one embodiment, if the primary key 221 in the user table 200 contains 16 columns, for example, then no XML index may be created on the XML columns XMLx210 and XMLY 220 of the primary table 200.

Multiple indexes may be created on the node table. For example, a primary index, clustered on PK, XID, which causes clustering in depth-first order of the XML hierarchy may be created. A NAME index may be a secondary index and may be created on NID, TID, PK, and XID. The NAME secondary index may be created automatically since it is useful for almost all queries on the XML data. An example is /Customer/Order, in which this index may be accessed with the token values for Customer and Order tags to determine the corresponding XML nodes.

As an additional example of a secondary index, a VALUE index may be created on VALUE, HID, PK, and XID columns. The VALUE secondary index is useful for value-based queries, and may be created at the same time as the node table. An example may be where the query /Customer/Order=20. The VALUE index may be used to look up the specified value to determine the corresponding XML nodes.

Data Definition Language Embodiments and Uses

In one embodiment of the invention, a data definition language may be used to create an XML index on a database table wherein an XML column of data is present. In this embodiment, it may be assumed that the XML data in the XML column of the database may be organized as text or as binary large objects as desired.

The first index on an XML column is the primary XML index, which includes the structure of the node table. In a typical embodiment, the data definition language construct to generate the primary XML index may be defined as follows:

```
CREATE PRIMARY XML INDEX xml_index_name
    ON table (xmlColumn)
```

```
[OVER (path_expression)]
[WITH (<index_options> [,...n])]
```

Use of the above data definition statements creates meta-data entries for xml_index_name both as a node table and as a primary XML index on xmlColumn of table. Additional parameters, such as the path_expression, may also be stored in meta-data.

The internal table desirably comprises the node table. It preferably contains rows conforming to the nodes satisfying the path expression, path_expression, in the OVER path_expression clause, including the attributes of the nodes. For example, if path_expression=/Customer/Order, then only the Order elements under Customer elements are indexed; the rest of the XML data (e.g., /Customer/Address) is not indexed. Furthermore, for a complex element, its value (e.g., fn:string( )) is not indexed. If no path_expression is specified, then the full node table, which corresponds to all nodes in the XML value may be created by default. If the software environment in which the embodiment exists is a SQL environment, then any path_expression allowed by the SQL environment may also be allowed in the index definition.

Upon execution of the data definition language statement to create a primary XML index, the desired node table structure is created and a clustered index is created on the node table. The clustering key may be PK, XID and preferably causes a depth-first order of the XML hierarchy. The node table and related structures are populated with the values from the XML column of the primary table. Updates occurring on the XML column are propagated to the XML index structures as well.

The data definition language statement for the creation of a primary index may also include a WITH <index_options> sub-statement that affects indexing options. In one embodiment, those index options may include:

```
PAD_INDEX = {ON | OFF}
FILLFACTOR = fillfactor
SORT_IN_TEMPDB = {ON | OFF}
STATISTICS_NORECOMPUTE = {ON | OFF
DROP_EXISTING = {ON | OFF}
ALLOW_ROW_LOCKS= {ON | OFF}
ALLOW_PAGE_LOCKS={ON|OFF}
MAXDOP=number_of_processors
```

These index options may be used to modify the behavior of the primary XML index and may be specified during the primary XML index creation.

In one embodiment of the invention, a primary XML index may be created only on a single XML column of a persistent or temporary table. Thus, no index may be created on multiple columns if one of the columns is of type XML. An XML index may be created in the same index namespace as other non-XML indexes. Thus, an XML index and a non-XML index on the same table with the same name may not be allowed.

The partitioning scheme may be based on the XML column values in the primary table. The user table may also have a clustered, primary key so that the partitioning scheme may be based on the primary key. In one embodiment, the partitioning scheme for the XML index may be specified in the data definition language statement for the XML index.

Multiple primary XML indexes with identical path expressions can be created on the same XML column of a primary table in conformance with standard non-XML index behavior. When another XML index is created on an existing XML column, the meta-data version of the user table may be incremented. In one embodiment, only a single path_expression may be specified per primary XML index. If the user wants to index multiple paths (e.g., /Customer/Order and //Address), then multiple primary XML indexes may be created using the current invention.

Queries on the primary table may match the path expression syntactically to determine whether the XML index can be used. Static type inferences using XML Schema may also be used. For example, suppose the primary XML index is built over the path expression /Customer/Order while a query specifies /Customer//Order. For an untyped XML column, the XML index cannot be used since index lookup may not yield all Order elements satisfying the query. However, for typed XML column, static analysis may indicate that Order elements occur only under /Customer element; the index can then be used.

Once a primary XML index has been created, users may create secondary XML indexes on the XML column of the primary table. These secondary XML indexes may be created as non-clustered indexes on the node table so that they can be controlled separately. For example, a PATH index with name idx_path and a VALUE index with name idx_value can be built independently on the same node table. These indexes can be altered and dropped independently as well. In most embodiments, the last index on an XML column to be dropped is the primary XML index.

A secondary XML index may be created using a data definition language statement set. In a typical embodiment, the data definition language construct to generate a secondary XML index is defined as follows:

```
CREATE XML INDEX index_name ON table (xmlColumn)
USING XML INDEX xml_index_name
FOR {VALUE | CHILD | PATH | REFERENCE | TEXT}
[WITH (<index_option> [,...n ]) ]
```

This data definition language statement set creates meta-data entries for index_name both as a (secondary) XML index on column xmlColumn of a SQL table, table, and as a non-clustered index on the node table xml_index_name. Additional parameters, such as the index type may also be stored in meta-data. Examples of index types may be VALUE, CHILD, PATH, REFERENCE and TEXT. The secondary XML indexes exist in the same namespace as other indexes on the user table.

A number (e.g., five) of exemplary index types may be generated in the typical exemplary data definition statement. The secondary index termed PATH may create a non-clustered index on (HID, VALUE, PK, XID) or alternately, (HID, PK, XID) of the primary node table of FIG. 2. Creation of the primary XML index also desirably creates a column for all paths in the XML column of the primary table. Users may wish to index these paths. Queries involving these paths benefit from the index lookup; the benefit is greater the length of the path. Thus, if the path /Customer/Order/@OrderID is common in a workload, users may want to create an index for this path.

The advantages of the PATH secondary index can be understood from the following example. To evaluate a path expression such as /Customer/Order/@OrderID, two JOIN operations are used; one to retrieve the OrderID attributes that occur under Order elements, and another to check that those Order elements occur under Customer elements. Thus, if the path expression is deep, then a number of JOIN operations are used, which can be inefficient. Alternatively, the query can scan the node table for an hierarchical identifier, HID, value which may not be as efficient as an index seek into the PATH index using the desired path.

To mitigate the cost of the JOIN operations, each PATH is desirably mapped to an internal value that can be determined at compile time. During query evaluation, the constant path values are used to seek into the PATH index on the HID column, thereby saving the cost of JOIN operations or node table scans. Increased speed results form the use of the PATH secondary index.

For example, consider the evaluation of the path expression:

/Customer[@Location="London"]/Order[@Order ID="123"]

This expression involves the evaluation of the paths /Customer/@Location and /Customer/Order/@OrderID. At compile time, these PATHs may be mapped to the values 401 and 601, for example. Query execution then seeks into the PATH index using HID=401 and HID=601. A JOIN may be used to ensure that those Order elements are the children of those Customer elements.

In the absence of the hierarchical index, a JOIN statement may be used to check @Location is a child of Customer; a second JOIN statement to check that @OrderID is a child of Order; and a third JOIN statement to check that the Order elements are children of those Customer elements. Instead, only the last JOIN is used if a hierarchical index is available, which saves the two JOIN operations statements. Increased speed and efficiency result from the use a secondary PATH index.

The secondary index type termed VALUE may create a non-clustered index on (VALUE, HID, PK, XID) of the primary node table of FIG. 2. The VALUE secondary index may be useful for queries on the XML column of the primary table, such as, for example, /Document/Section[@*=123]. By including HID in the VALUE secondary index, the determination of qualifying paths to match the parent (e.g., /Document/Section in this example) or ancestor's path is enabled.

The secondary index termed CHILD may create a non-clustered index on (GetParent(XID), PK, XID) of the primary node table of FIG. 2. In this instance, the GetParent (XID) column of the primary node table (shown as PID 243 in FIG. 2) may be generated as part of the primary index node table. The GetParent(XID) column may be defined as the parent identifier PID and may be generated via a data definition statement such as:

```
ALTER   TABLE   Node_Table name
ADD COLUMN PID GetParent(XID)
```

The CHILD secondary index may be desirable for navigational access. For example, an expression such as /Customer [@Location="London"]/evaluates all the children of those Customers that are located in London. This scans all the descendant nodes of Customer, owing to the clustering effect of PK, XID, and selecting the relevant children of Customer. If this type of query is prevalent for an application, for example, in the navigation of a hierarchy, then it may be beneficial to create a CHILD secondary index for the parent-child relationship.

The secondary index termed REFERENCE may create a non-clustered index on reference attributes ID/IDREF that may be generated in the primary node table of FIG. 2. This speeds up following IDREF reference links during query processing. The secondary index termed TEXT may create a non-clustered index on text aggregates under each node. Once again, the text aggregates may be specified as part of the node table. This is useful for string searches. In addition, other secondary indexes may be generated, provided the primary index supports the secondary index definition.

In accordance with the invention, multiple secondary XML indexes of the same type can be created using the same primary XML index. For example, multiple secondary VALUE indexes may be created using the same primary XML index.

In one embodiment of the invention, implementation of the XML index may be facilitated via the use of a table-valued function which may be created with the following data definition language statements.

```
CREATE FUNCTION SHRED_XML (
        @xmlcol XML)              -- XML column on which to
                                     execute
RETURNS @ShreddedRows TABLE (
        XID       OrdPath,        -- node id
        NID       int,            -- the name ID value
        TID       int,            -- the type ID value
        VALUE     sql_variant,    -- (small) value column
        LVALUE    nvarchar(max),  -- large value column
        HID       int             -- tokenized path
        ) AS
BEGIN
        DECLARE   @Temp TABLE (
                  XID OrdPath, NID int, TID int,
                  VALUE sql_variant,
                  LVALUE nvarchar(max), ...)
        INSERT    INTO @Temp
        SELECT    *
        FROM      Rowset-generated-by-shredding-XML-BLOB-
@xmlcol-with-
                  path-expression-and-max-level-applied
        INSERT    INTO @ShreddedRows
        SELECT    XID, NID, TID, VALUE,
                  LVALUE, HID FROM @Temp
        RETURN
END
```

In the data definition language statements, the XML column of the primary table is shredded and the results are returned as metadata containing the XML identifier XID, the name identifier NID, the type identifier TID, the value argument VALUE, large value argument LVALUE, and the hierarchical identifier HID. These identifiers may be similar in nature to those identifiers of the same name described previously in FIG. 2.

In the above example, the DECLARE clause declares a temporary table called @temp. The INSERT statement inserts rows into the @temp table. The FROM clause functions to operate on an XML value and generate node table rows. The second INSERT statement returns all rows from the temp table.

In one embodiment, an indexed view may be facilitated. Upon use of the CREATE XML INDEX statement on an XML data type column on the primary table, a meta-data object is created for the index. In addition, auxiliary structures may be created automatically within the same data definition language implementation to implement the node table as an indexed view. The XML subsystem may use the table-valued function SHRED_XML to create the indexed view. The indexed view may be created using, for example, the data definition language statements:

```
CREATE VIEW index-name AS
    SELECT    T.PK, NT.*
    FROM      table T
              CROSS APPLY SHRED_XML (X) NT
``` where PK is the non-null, clustering primary key in the primary table on which the view is being created. When XML values in the user table are updated, the changes may be propagated to the indexed view. Only the incremental difference need be propagated. However, owing to the occurrence of the table-valued function, the computation of the difference may be difficult. This is solved by deleting the rows in the node table corresponding to the old XML values and hen inserting the new rows for the updated XML values.

The indexed view is desirably visible and users can freely create view using CREATE STATISTICS, DBCC, and SHOW_STATISTICS, for example, and update statistics, using UPDATE STATISTICS, on the individual columns of the indexed view.

Once the indexed view has been created, the first clustered index in the indexed view may be defined using the data definition language statements:

```
CREATE UNIQUE CLUSTERED INDEX internal-index-name
    ON index-name (PK, XID)
    [WITH <index_option> [,...n ] ]
    [ON {partition_scheme_name (column_name [1,...n]) |
    filegroup }]
```

Operations with Indexes

In one embodiment of the present invention, in a SQL Server® programming environment, primary and secondary indexes on the XML columns of the primary table may be manipulated with data definition language statements. For example, an XML index may be altered using the data definition language statement:

```
ALTER {INDEX {index_name | ALL} ON {table | view}
    { REBUILD [WITH ( <rebuild_index_option> [ ,...n] ) ]
    | DISABLE
    | REORGANIZE [ WITH (LOB_COMPACTION={ON | OFF}) ]
    | SET (<set_index_option> [ ,...n] )}
```

The ALTER INDEX data definition language statement is meant for rebuilding, reorganizing, and changing set options on B+-trees. The primary table is specified for altering the XML index referred to as index_name. If a primary XML index is DISABLE'd, it is no longer used in queries. Hence, any secondary XML indexes are also not used. The DISABLE command is propagated to the secondary XML indexes. Secondary XML indexes may be individually DISABLE'd.

The primary XML index is desirably rebuilt before the secondary XML indexes on it when using the REBUILD statement. The order is preferable for consistency. If REBUILD ALL is specified, then the data definition language statement rebuilds the XML indexes in the proper order.

Otherwise, in keeping with the behavior of non-XML indexes, users may REBUILD the XML indexes individually in the proper order.

The REORGANIZE statement may be invoked on the primary XML index and is not propagated to the secondary XML indexes. It may be invoked separately on the secondary XML indexes.

A primary or secondary XML index may optionally be dropped using the data definition language statement:

---
DROP INDEX index_name [,...n] ON table
---

Use of this data definition language statement drops the XML primary or secondary index from meta-data and all associated storage If the primary XML index is dropped, all secondary XML indexes on it are also desirably dropped. This is analogous to dropping indexes when a table is dropped. Metadata storage may also be cleared when XML indexes are disabled. When a table containing one or more XML columns is dropped, all XML indexes defined on those XML columns are preferably dropped as well.

As mentioned above, while exemplary embodiments of the present invention have been described in connection with various computing devices and network architectures, the underlying concepts may be applied to any computing device or system in which it is desirable to implement an XML index. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A computer-executed method of retrieving XML data from a database, the method comprising:

creating a primary table structure to hold XML data as a binary large object in an XML column, wherein each row in the primary table comprises a primary key;

creating a primary XML index relating to the primary table structure, where the primary XML index includes a first XML path to a node table;

populating the primary table and the primary XML index, wherein the primary XML index is populated by shredding XML values stored as the binary large object in the XML column of the primary table, and wherein the XML index preserves document order and structure by duplicating a respective primary key from the primary table and combining it with an XML node identifier for each entry in each node table;

creating an alternate secondary path index in a form of (HID, HID value, PK, XID) to reduce a number of join operations for queries on the primary XML index table, wherein HID represents a hierarchical identifier, HID value represents a path efficiency, PK represents a primary key, and XID represents an XML node identifier;

querying on the primary table, which then uses the created XML path indexes by directing the query to a location identified in the XML index node table to satisfy the query, whereby XML data is retrieved from the database; and retaining the primary table and primary XML index so that subsequent queries execute faster than an initial query.

2. The method of claim 1, wherein the node table comprises a B+–tree structure.

3. The method of claim 1, wherein the creating a primary table structure comprises creating a structure for XML data and non-XML data.

4. The method of claim 3, wherein the querying retrieves XML and non-XML data.

5. The method of claim 1, wherein the method is performed by a database engine.

6. The method of claim 1, further comprising:
populating the secondary XML index; and
querying on the primary table wherein the query utilizes the primary XML index and the secondary XML index to retrieve the XML data.

7. The method of claim 1, wherein the querying further comprises utilizing multiple path expressions in the retrieval of the XML data.

8. A machine-readable medium having instructions therein, executable by a machine to perform a method of retrieving XML data from a database using a query, the method comprising:

creating a primary table structure to hold XML data as a binary large object in an XML column, wherein each row in the primary table comprises a primary key;

creating a primary XML index relating to the primary table structure, where the primary XML index includes a first XML path to a node table;

populating the primary table and the primary XML index, wherein the primary XML index is populated by shredding XML values stored as the binary large object in the XML column of the primary table, and wherein the XML index preserves document order and structure by duplicating a respective primary key from the primary table and combining it with an XML node identifier for each entry in each node table;

creating an alternate secondary path index in a form of (HID, HID value, PK, XID) to reduce a number of join operations for queries on the primary XML index table, wherein HID represents a hierarchical identifier, HID value represents a path efficiency, PK represents a primary key, and XID represents an XML node identifier;

querying on the primary table, which then uses the created XML path indexes by directing the query to a location identified in the XML index node table to satisfy the query, whereby XML data is retrieved from the database; and retaining the primary table and primary XML index so that subsequent queries execute faster than an initial query.

9. The machine-readable medium of claim 8, wherein the node table comprises a B$^+$-tree structure.

10. The machine-readable medium of claim 8, wherein the creating a primary table structure comprises creating a storage table for XML and non-XML data.

11. The machine readable medium of claim 8, wherein the querying retrieves XML data and non-XML data.

12. A computer system for performing queries on XML data, the system comprising:
 an input device for receiving a query;
 a processor for executing the query;
 at least one organization of XML data;
 a software structure providing an XML index of the XML data stored in a primary table as a binary large object, wherein each row in the primary table comprises a primary key, wherein nodes of the XML index are organized as a B+-tree, and wherein the XML index is populated by shredding XML values from the binary large object such that the XML index preserves document order and structure by duplicating a respective primary key from the primary table and combining it with an XML node identifier to create a first XML path for each entry in each node table;
 means to create an alternate secondary path index in a form of (HID, HID value, PK, XID) to reduce a number of join operations for queries on the primary XML index table, wherein HID represents a hierarchical identifier, HID value represents a path efficiency, PK represents a primary key, and XID represents an XML node identifier; and
 an application program which allows the processor to utilize the created XML path indexes as tools for performing the query against the primary table wherein the query is executed and results of the query are returned in response to the query.

13. The system of claim 12, wherein the application program is database management system software and the processor executes the application program.

14. The system of claim 12, further comprising an output device wherein the results of the query are provided for examination.

* * * * *